United States Patent [19]

Lagani, Jr.

[11] 4,281,780
[45] Aug. 4, 1981

[54] HERBICIDE SPRAY SYSTEM

[76] Inventor: Anthony Lagani, Jr., 78 Springbrook Rd., Morristown, N.J. 07960

[21] Appl. No.: 40,751

[22] Filed: May 21, 1979

[51] Int. Cl.³ .............................................. A01C 15/04
[52] U.S. Cl. .................................... 222/610; 222/617; 222/623; 222/372; 239/663; 239/685; 239/157
[58] Field of Search ............... 222/608, 609, 610, 614, 222/617, 621, 623–625, 192, 372; 239/663, 662, 157, 685

[56] References Cited

U.S. PATENT DOCUMENTS

| | | | |
|---|---|---|---|
| 2,491,818 | 12/1949 | Lapp | 239/157 |
| 3,596,791 | 8/1971 | Olsson | 222/609 |
| 4,106,704 | 8/1978 | McRoskey | 239/685 |

Primary Examiner—Allen N. Knowles

[57] ABSTRACT

A herbicide spray system comprising a rotary lawn spreader in combination with a spray system comprising a fluid reservoir, pumping means and means for coupling said pumping means to said rotary spreader. The fluid reservoir is removable from the spreader load carrier and requires no substantial modification thereof to adapt the pumping means to be driven by the spreader.

5 Claims, 4 Drawing Figures

U.S. Patent   Aug. 4, 1981   4,281,780
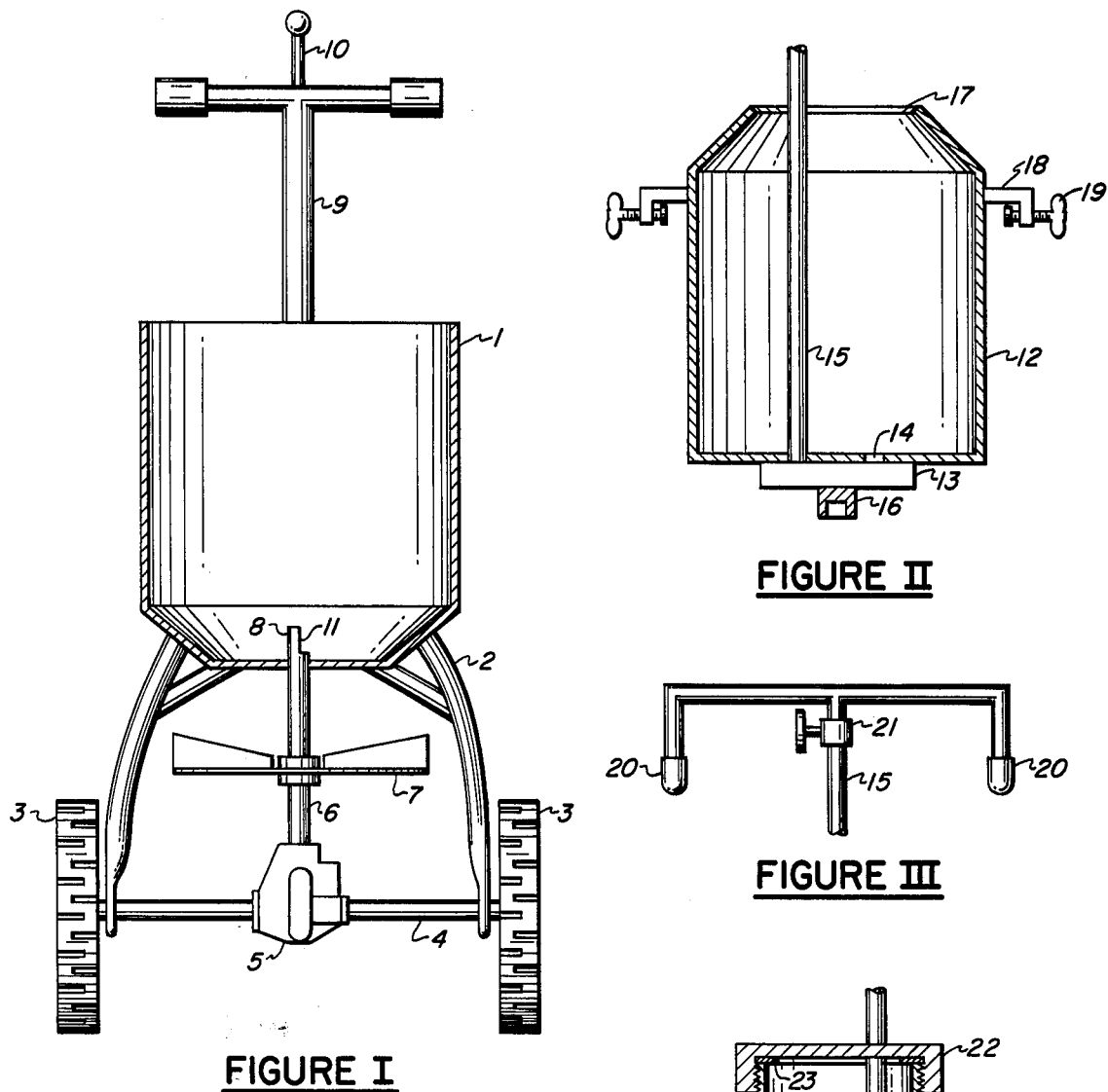
FIGURE I
FIGURE II
FIGURE III
FIGURE IV

HERBICIDE SPRAY SYSTEM

BACKGROUND OF INVENTION

The care of lawns is both expensive and laborious; in particular, because of the need to kill or remove weeds. The two common methods of applying herbicides is by broadcasting a granular product or spraying a liquid herbicide. The granular products are expensive to apply. On the other hand, the liquid spray method is laborious since the usual method of operation is by hand pump air pressurized cannisters.

Professional gardeners have available to them pump system comprising a cannister having a pumping means driven off a wheel pulley. The cannister is usually mounted in a horizontal position with the pump located at one end being belt driven off a pulley mounted concentric with and driven by the wheel axle. Although such a device serves the purpose well, it serves only a single function and is expensive.

What is required is a low cost pumping means for herbicides which can be adapted to existing garden equipment.

SUMMARY OF THE INVENTION

It has surprisingly been found that a rotary spreader can be adapted to function as the drive means for a liquid herbicide pumping system. The pumping system comprises liquid reservoir cannister, pumping means and spraying means. The pumping means is driven by the rotatory spreader drive shaft.

BRIEF DESCRIPTION OF DRAWINGS

FIG. I—Rotatory Spreader
FIG. II—Pump Spraying System
FIG. III—Nozzle Assembly
FIG. IV—Air Pressured Pumps Spraying System

DETAILED DESCRIPTION

This invention relates to a liquid herbicide pumping system which can be operated from existing lawn equipment. More particularly it relates to a herbicide pumping system which is driven by a rotatory spreader.

The most widely used rotatory type spreader used in the cyclone spreader. Though all such spreaders have substantially the same operating principle, the cyclone spreader will be used by way of illustrative description of this invention.

Referring now to FIG. 1, the rotatory spreader comprises a load carrier, 1, for carrying the granulated material to be broadcast such as seeds or fertilizer. The load carrier is supported on a frame, 2, which is supported on the wheel axle, 4, which is driven by the wheels, 3. The axle drives a gear located in the transfer case, 5, through which the drive shaft, 6, is driven. The driven shaft, 6, has concentrically mounted thereon a broadcast impeller, 7. Granulated material falling from the load carrier, 1, onto the impeller, 7, is thrown outward by centrifugal force. The drive shaft, 6, continues through the impeller, 7, into the load carrier, 1, where it terminates in a stirrer bar, 8. A wire stirrer is usually mounted on the stirrer bar, 8, to insure free flowing of the granular material. The rate of flow of the granular material is controlled by a control rod, 10, mounted on a handle, 9. The stirrer bar, 8, although generally circular in cross-section has a flattened portion, 11, which serves to drive the stirrer.

The liquid herbicide pumping means of this invention comprises, as shown in FIG. II, a liquid resevoir cannister, 12, equipped with a pump, 13. Liquid herbicide enters the pump inlet, 14, and exits through the fluid delivery tube, 15. The pump is driven by a drive shaft, 16, which is adapted to be driven by engagement with the stirrer bar, 8, of the rotatory spreader. In a preferred embodiment the cannister, 12, is fixedly mounted to the spreader load carrier, 1, by means of support brackets, 18, and prevented from rotating by securing means comprising lock screws, 19, or other suitable means.

The liquid herbicide exits the fluid outlet tube into a nozzle assembly. Referring to FIG. III the nozzle assembly comprises at least one spray nozzle, 20, and may optionally include a flow control valve, 21.

Although the invention has been described in terms of positive pumping of a liquid it is obvious to those skilled in the art that the pumping means may be used to generate air pressure within the cannister, 1. In the event that the cannister fill opening, 17, must be equipped with an air tight seal and the fluid delivery line terminates above the bottom of the cannister as a dip tube through which liquid herbicide is forced by pressure on a head space above the liquid in the liquid resevoir cannister. Where the pump is used to develop an air pressure it may discharge either into the liquid or into the head space above the liquid.

The pumping means may comprise either reciprocating or rotatory pumping means and may be of the positive displacement (fixed volume) or volume displacement type, e.g. centrifigal pump.

The pump drive shaft may be an integral part of the pump or it may be a separate unit which after having been secured to the stirrer bar, 8, is inserted into the pump means when the pumping system is lowered into the load carrier, 1, of the rotatory spreader.

In its simplest embodiment, the pump drive shaft, 16, is adapted to the stirrer bar 8, by providing the shaft, 16, with a substantially cylindrical hole which has a flat filled side so that its cross section matches that of the stirrer bar, 8, at its flatten portion, 11. Any other suitable securing means such as set screws may be used to adapt the pump drive shaft, 16, to the stirrer bar, 8.

The term "pumping system" as used in the specification and claims means the liquid resevoir cannister together with the pumping means and means for adapting the pump drive to the stirrer bar of the rotatory spreader as well as means for distributing the liquid herbicide to at least one spray head.

The term rotatory spreader as used in the specification and claims means the spreader described herein and illustrated in FIG. I.

As used in the specification and claims with respect to the fluid delivery tube, 15, the term "communicating with said pumping means" includes both direct communication with the pumping means as well as communication as a result of air pressure developed by the pumping means causing fluid to be forced into a dip tube type of fluid delivery tube.

The term "head space" as used in the specification and claims means an air space in the liquid reservoir cannister over a liquid contained in the cannister.

What is claimed is:

1. A liquid pumping device comprising a rotary spreader including
    (a) a load carrier;
    (b) means for supporting said load carrier on rotatable means for moving said load carrier;

(c) a drive shaft terminating in a stirrer bar being located within said load carrier; and
(d) means cooperable with said rotatable means for rotating said drive shaft and stirrer bar;

in combination with a pumping system comprising
(e) a liquid reservoir cannister removably deposited into said load carrier;
(f) a spray nozzle assembly comprising at least one outlet nozzle and a fluid delivery tube extending into said cannister;
(g) pumping means on said cannister for pumping the liquid in said cannister into said delivery tube;
(h) means for engaging the stirrer bar of said spreader with the pumping means when the cannister is deposited in the load carrier whereby movement of said rotatable means causes rotation of said drive shaft and stirrer bar thereby driving the pumping means and enabling the liquid contained in the cannister to move through the delivery tube for dispensation from the outlet nozzle.

2. The liquid pumping device of claim 1 wherein the pumping means is a positive displacement pump pumping liquid into the spray nozzle assembly.

3. The liquid pumping means of claim 1 wherein the pumping means generates an air pressure in a head space in the cannister above a liquid contained in the cannister thereby forcing water through the fluid outlet tube into the spray nozzle assembly.

4. The liquid pumping device of claim 1 wherein the spray nozzle assembly includes a flow control valve.

5. The liquid pumping device of claim 3 wherein the pumping means is a centrifugal pump.

* * * * *